J. B. Lyons.
Moulding Peat.

N° 73616      Patented Jan. 21, 1868

Witnesses.
M. Dennison
Geo. C. Green

Inventor
James B. Lyons
By Attorneys
J. B. Woodruff & Son

United States Patent Office.

JAMES B. LYONS, OF NEW HAVEN, CONNECTICUT, ASSIGNOR TO LYONS PEAT-COAL AND MACHINE COMPANY, OF NEW YORK CITY.

*Letters Patent No. 73,616, dated January 21, 1868.*

IMPROVED MACHINE FOR MOULDING PEAT.

*The Schedule referred to in these Letters Patent and making part of the same.*

TO ALL WHOM IT MAY CONCERN:

Be it known that I, JAMES B. LYONS, of the city and county of New Haven, in the State of Connecticut, have invented certain new and useful Improvements in Peat-Moulding Machines; and the following is a full, clear, and exact description of the same, reference being had to the accompanying drawings, making a part of this specification, in which—

Figure 1:
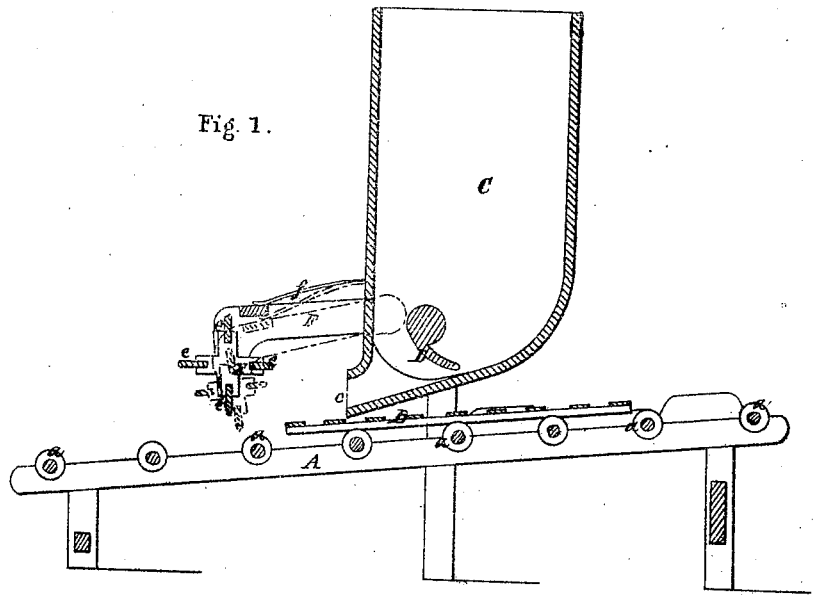
Figure 1 represents a section through a side elevation of the machine.
Figure 2:
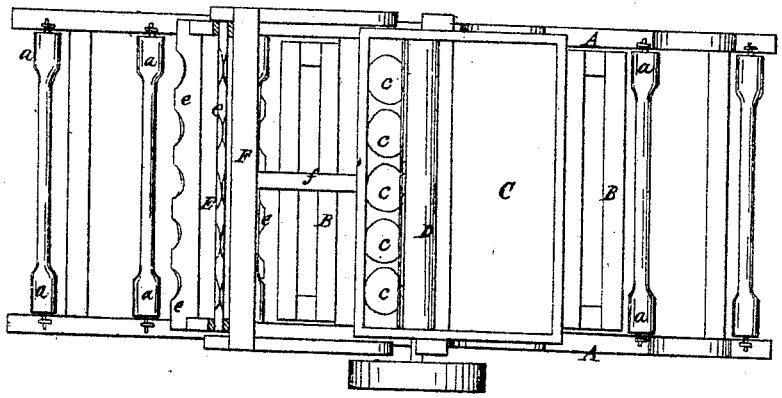
Figure 2 shows a plan or top view of the same.

The object of my invention is to save manual labor in the preparation and manufacture of peat-fuel; and consists in the construction and arrangement of the hopper and apparatus for forcing the mass out of the apertures and delivering it on racks for drying. Also, in the apparatus for marking off the peat in suitable lengths and indenting it as it is delivered on the racks from the apertures of the moulding-machine, so that it can be easily parted in blocks or plugs at the indentations.

To enable others to make and use my invention, I will describe it more fully, referring to the drawings, and to the letters marked thereon.

I make a frame of timber or of iron, of suitable width and length, the side pieces A A being placed on an incline, on which are supported a series of rollers, $a$ $a$ $a$ $a$, they having journals, whose bearings are secured at suitable distances apart on the incline bars A A. These rollers are for the purpose of supporting and conveying racks B B under the hopper C to receive the doughey mass of peat as it is forced out through a series of apertures, $c$ $c$ $c$ $c$, in the lower side of the bottom of the hopper C, the apparatus for forcing out being a revolving snail-wing wiper, D, operating inside of the hopper in and against the apertures $c$ $c$ $c$ $c$, so that a continuous round mass of peat is being delivered in longitudinal rolls on the racks B B. In front of the apertures $c$ $c$ $c$ $c$, at any desired distance from their mouths, I place a revolving marker, E, it having four, more or less, curve-notched cutting-blades, $e$ $e$ $e$ $e$, which being secured to a movable frame, F, and held down by a spring, $f$, marks or indents the rolls of peat as they are delivered on the racks B, so that they are easily broken into uniform pieces for use after they have been dried on the racks, which are carried off, as they are filled, and placed in a suitable place for drying.

Any number of the racks B may be used, as they are placed on the rollers $a$ $a$ at the elevated end of the machine, and are carried under the hopper by their own gravity, and the peat being delivered on them carries them through, so that they are taken off at the lower end, or conveyed to any distance by an endless belt, thus saving a vast amount of manual labor.

What I claim as my invention, and desire to secure by Letters Patent, is—

1. Delivering the peat in rolls or bars on the drying-racks, for the purposes set forth.

2. I claim the revolving marker E, with its blades $e$ $e$ $e$ $e$, as arranged, in combination with the delivering-mechanism and drying-racks, substantially as herein described, for the purpose described.

In testimony whereof, I hereunto subscribe my name in the presence of—

JAMES B. LYONS.

Witnesses:
 LUZON B. MORRIS,
 JOHN H. WELCH.